(12) United States Patent
Desai et al.

(10) Patent No.: US 9,247,064 B2
(45) Date of Patent: Jan. 26, 2016

(54) TIERED CALL ROUTING

(71) Applicant: Verizon Patent and Licensing Inc., Basking Ridge, NJ (US)

(72) Inventors: Prashant B. Desai, Land O Lakes, FL (US); Mayuresh Mohan Hegde, Irving, TX (US); Parind S. Poi, Lewisville, TX (US); Shawn J. Hadley, Keller, TX (US); Paul V. Cunningham, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/940,734

(22) Filed: Jul. 12, 2013

(65) Prior Publication Data
US 2015/0016600 A1 Jan. 15, 2015

(51) Int. Cl.
*H04M 3/51* (2006.01)
*H04M 3/523* (2006.01)

(52) U.S. Cl.
CPC .......... *H04M 3/5232* (2013.01); *H04M 3/5238* (2013.01); *H04M 2203/551* (2013.01)

(58) Field of Classification Search
CPC ............ H04M 3/5232; H04M 3/5238; H04M 2203/551
USPC .............. 379/265.01, 265.02, 265.09–265.14
See application file for complete search history.

(56) References Cited

U.S. PATENT DOCUMENTS

| | | | |
|---|---|---|---|
| 6,577,727 B1 * | 6/2003 | Hymel .................... | 379/265.05 |
| 7,254,641 B2 * | 8/2007 | Broughton et al. .......... | 709/240 |
| 8,634,541 B2 * | 1/2014 | Flockhart et al. ........ | 379/265.12 |
| 8,737,600 B2 * | 5/2014 | Kamlet et al. ........... | 379/266.01 |
| 2004/0141508 A1 * | 7/2004 | Schoeneberger et al. ..... | 370/401 |
| 2007/0064912 A1 * | 3/2007 | Kagan et al. ............... | 379/265.1 |
| 2008/0118052 A1 * | 5/2008 | Houmaidi et al. ........ | 379/265.11 |

* cited by examiner

*Primary Examiner* — Harry S Hong

(57) ABSTRACT

A computer device may include logic configured to receive a request to route a call from an interactive voice response system; obtain information associated with the call; and obtain one or more metrics associated with a plurality of automatic call distribution centers. The logic may be further configured to select a rule to route the call based on the information associated with the call; and select a particular automatic call distribution center for the call based on the selected rule, based on the obtained information associated with the call, and based on the obtained one or more metrics.

20 Claims, 10 Drawing Sheets

340

| ACD 505 | AREA OF EXPERTISE 510 | ⎫ |
| --- | --- | --- |
| | NUMBER OF INBOUND CALLS 515 | |
| | NUMBER OF CALLS IN QUEUE 520 | |
| | NUMBER OF AGENTS 525 | |
| | PERCENT OCCUPANCY 530 | ⎬ 501 ● ● ● |
| | AVERAGE HANDLING TIME 535 | |
| | EXPECTED WAIT TIME 540 | |
| | OLDEST CALL WAITING TIME 545 | |
| | NUMBER OF AGENTS IN QUEUE 550 | |
| | CUMULATIVE CALL COUNT 555 | |
| | WORK FLOW MANAGEMENT DATA 560 | ⎭ |

TIERED CALL ROUTING

BACKGROUND INFORMATION

Companies, or other types of entities, may maintain contact centers to handle customer telephone calls. If a customer calls a company with a particular problem, question, or request, the customer may be directed to a contact center. The contact center may assign the call to a contact center agent and the contact center agent may help the customer with the problem, question, or request. As contact centers migrate to a Voice over Internet Protocol (VoIP) and/or Session Initiation Protocol (SIP) environment, capacity of automatic call distribution (ACD) centers may increase and ACD centers may manage a large number of contact center agents. Management of business rules for selecting agents from a large number of ACD centers and/or a large number of agents may be quite complicated.

BRIEF DESCRIPTION OF THE DRAWINGS

FIG. 5 is a diagram illustrating exemplary information that may be stored in an automatic call distribution metric cache of the call routing system of FIG. 1;

DETAILED DESCRIPTION OF PREFERRED EMBODIMENTS

The following detailed description refers to the accompanying drawings. The same reference numbers in different drawings identify the same or similar elements.

Implementations described herein relate to a call routing system that distributes calls across multiple automatic call distribution (ACD) centers. The call routing system may obtain metrics associated with ACD centers, such as, for example, the number of inbound calls for an ACD center, the number of calls in queue for the ACD center, the oldest waiting time for a call in queue in the ACD center, the number of available agents associated with the ACD center, the percent occupancy of agents associated with the ACD center, the average handling time for a call in the ACD center, expected wait time for calls being handled by the ACD center, the number of agents associated with the ACD center that are associated with a call queue, a cumulative call count for a particular time period, and/or other metrics that may be measured for an ACD center. The metrics may be collected in real-time, or near real-time, ACD centers monitored by the call routing system.

Furthermore, the call routing system may obtain information associated with a call that is to be routed, such as a reason for the call, the time of day of the call, the day of the week for the call, and/or other types of call-related information. Moreover, the call routing system may obtain information associated with the caller, such as the location of the caller, customer information associated with the caller, and/or other type of caller information. The call routing system may obtain other types of data, such as work flow data received from a work flow management application.

The call routing system may maintain a database of business rules and may select a business rule based on one or more variables, such as, for example, a reason for the call, a time of day, a location of the caller, a type of customer associated with the caller, and/or other variables that may be used to select a particular rule. A rule may include one or more tiers. Each tier may correspond to a decision point of the rule that specifies one or more conditions and a destination, such as a particular ACD. For example, a tier may specify that, if a particular ACD center, whose agents specialize in sales calls, has an agent occupancy below 90% and the call corresponds to a sales call, the call is to be routed to the particular ACD center. Thus, each tier may specify a particular destination. If the conditions of a tier are not satisfied, the call routing system may move down the rule to the next tier and may determine whether the conditions associated with the call, as well as the obtained ACD metrics, satisfy the conditions of the next tier. The call routing system may move down the tiers of the selected rule until a tier is found whose conditions are satisfied. If no tiers in the rule are satisfied, the call may be routed to default destination.

Figure 1:
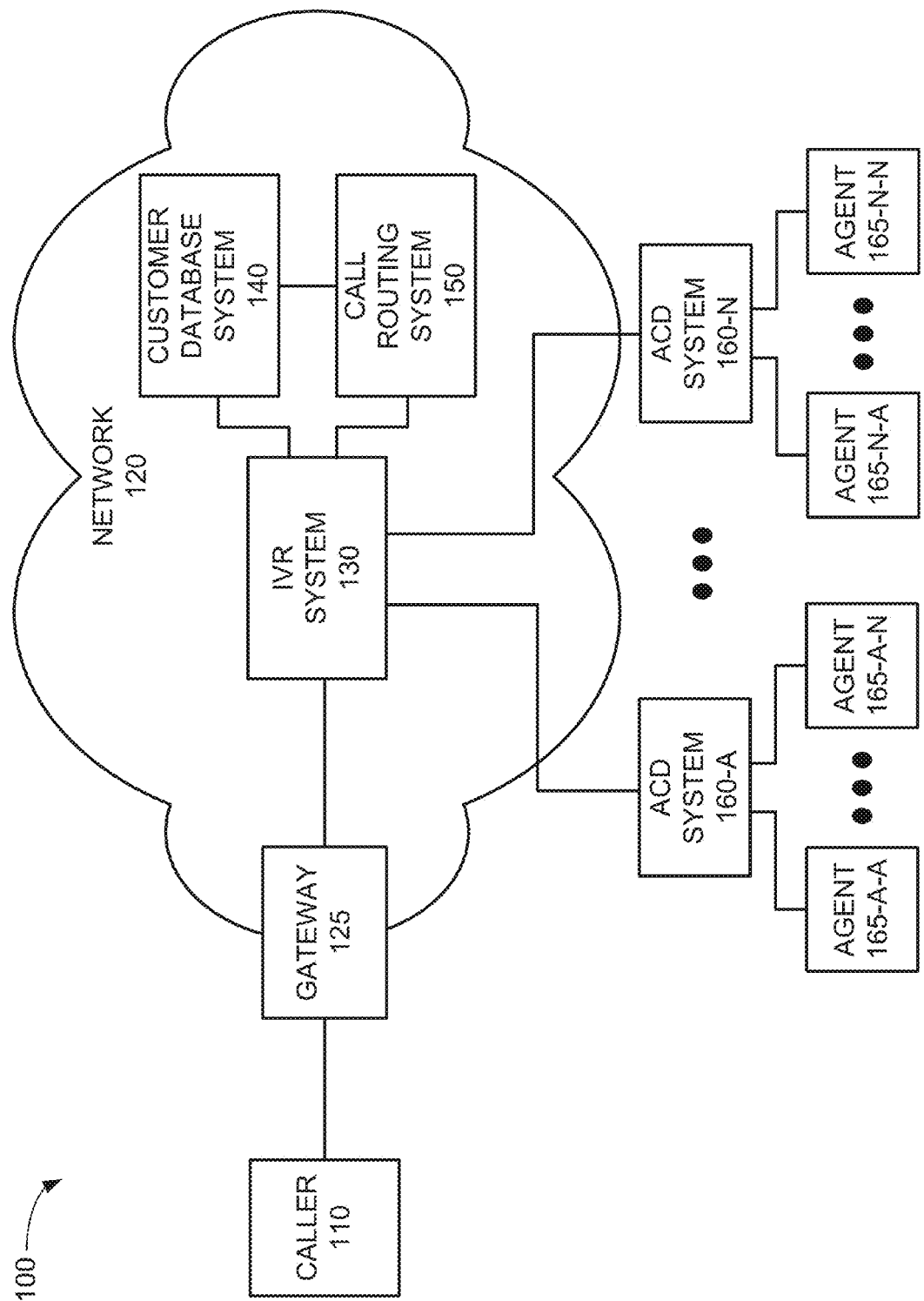
FIG. 1 is a diagram illustrating an exemplary environment according to an implementation described herein.

FIG. 1 is a diagram of an exemplary environment 100 in which the systems and/or methods described herein may be implemented. As shown in FIG. 1, environment 100 may include a caller 110, a network 120, ACD systems 160-A through 160-N (referred to herein collectively as "ACD systems 160" and individually as "ACD system 160"), and agents 165-A-A through 165-N-N (referred to herein collectively as "agents 165" and individually as "agent 165").

Caller 110 may include any device configured for placing and/or receiving telephone calls and/or configured to communicate with agents 165 using another communication method (e.g., video calls, email, chat, text messages, etc.). For example, caller 110 may include a portable communication device (e.g., a mobile phone, a smart phone, a phablet device, a global positioning system (GPS) device, and/or another type of wireless device); a telephone terminal; a personal computer or workstation; a server device; a laptop, tablet, or another type of portable computer; a set-top box; a gaming system; and/or any type of device with communication capability. Caller 110 may function as a Session Initiation Protocol (SIP) client, as a Web Real-Time Communication (WebRTC) client, and/or as another type of communication client.

Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks. Network 120 may include a gateway 125, an interactive voice response (IVR) system 130, a customer database (DB) system 140, and a call routing system 150.

Gateway 125 may provide access to network 120 for caller 110. For example, gateway 125 may authenticate caller 110 and/or may assign an identifier to caller 110 with respect to network 120. Gateway 125 may include a SIP gateway, a WebRTC gateway, a packet data network gateway, and/or another type of gateway.

IVR system 130 may function as an initial answering point for calls from caller 110. IVR system 130 may answer a call from caller 110, may play a greeting to caller 110, and may prompt the user, through played audio messages, to provide information to IVR system 130. For example, IVR system 130 may prompt the user to provide a reason for the call, to provide information identifying the caller (e.g., an account number, a name, etc.), to provide information identifying an order or subscription associated with the caller, to provide location information associated with the caller, and/or to provide other types of information. IVR system 130 may provide the collected information to call routing system 150 and/or to customer DB system 140. Call routing system 150 may select a destination for the call and may instruct IVR system 130 to route the call to a particular ACD system 160 and/or a particular agent 165.

Customer DB system 140 may store information about customers associated with ACD systems 160 and/or agents 165. For example, customer DB system 140 may store account information for customers associated with ACD systems 160 and/or agents 165. When a customer associated with caller 110 is identified, call routing system 150 may retrieve information about the customer from customer DB system 140.

Call routing system 150 may determine a destination for a call received by IVR system 130. Call routing system 150 may maintain a rules DB of rules for routing audio or video calls. Call routing system 150 may receive a request to route a call from IVR system 130, may obtain information associated with the call from IVR system 130 and/or from customer DB system 140, may obtain ADC metrics from ADC systems 160, may select a rule from the rules DB, and may apply the obtained information associated with the call and the obtained ACD metrics to the selected rule to select a particular ACD system 160 (from ACD systems 160) to which the call is to be routed. In other implementations, call routing system 150 may handle other types of communications, such as email messages, Short Message Service (SMS) messages, instant messaging messages, and/or other type of communication messages, and may receive such messages from gateway 125, rather than receiving a request to route the message from IVR system 130.

ACD system 160 may manage a pool of agents 165. For example, ACD system 160 may receive a call from caller 110 and may select an agent 165 from the pool of agents to handle the call. ACD system 160 may monitor one or more metrics and may provide real-time data about the one or more metrics to call routing system 150.

Agent 165 may include any device configured for placing and/or receiving telephone calls and/or configured to communicate with caller 110 using another communication method (e.g., video calls, email, chat, text messages, etc.). For example, agent 165 may include a portable communication device (e.g., a mobile phone, a smart phone, a phablet device, a global positioning system (GPS) device, and/or another type of wireless device); a telephone terminal; a personal computer or workstation; a server device; a laptop, tablet, or another type of portable computer; and/or any type of device with communication capability. Agent 165 may function as a Session Initiation Protocol (SIP) client, as a Web Real-Time Communication (WebRTC) client, and/or as another type of communication client. Agent 165 may log into ACD system 160 and may receive a call from caller 110 via ACD system 160 when ACD system 160 selects agent 165 to handle a call.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
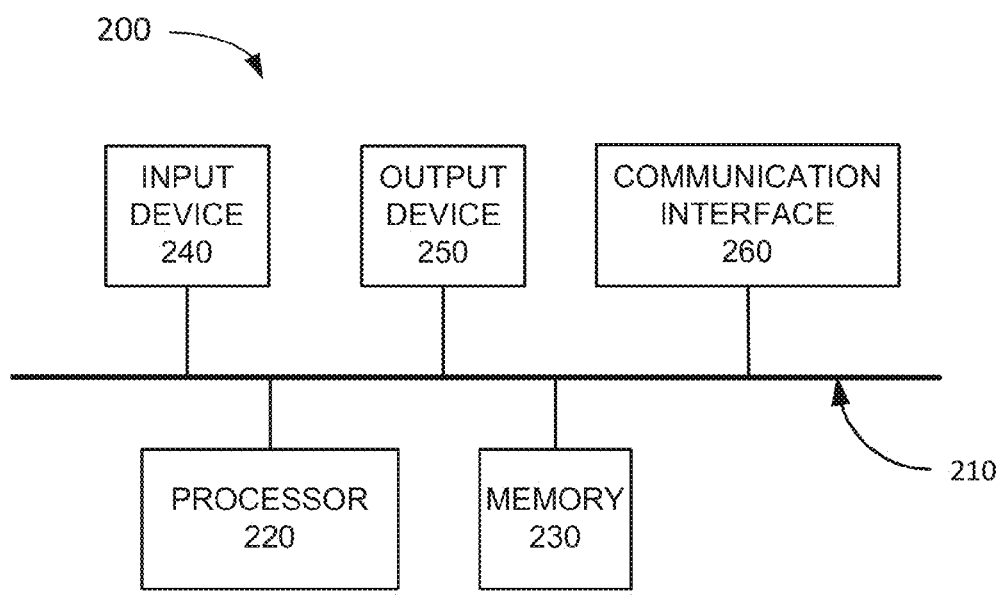
FIG. 2 is a diagram illustrating exemplary components of a device that may be included in one or more components of FIG. 1.

FIG. 2 is a diagram illustrating exemplary components of a device 200 according to an implementation described herein. Caller 110, gateway 125, IVR system 130, customer DB system 140, call routing system 150, ACD system 160, and/or agent 165 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to routing calls. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
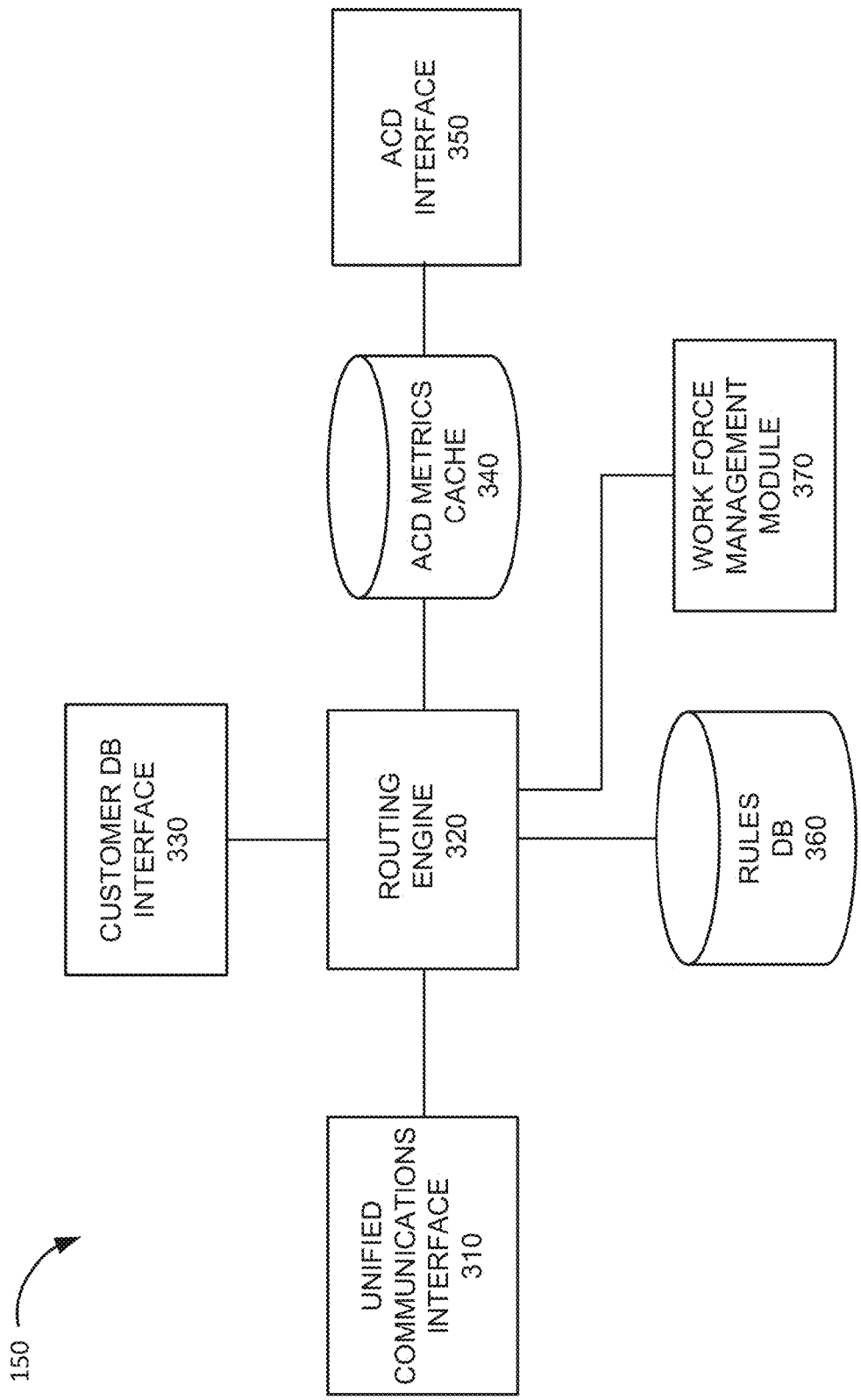
FIG. 3 is a diagram illustrating exemplary functional components of the call routing system of FIG. 1.

FIG. 3 is a diagram illustrating exemplary functional components of call routing system 150. The functional components of call routing system 150 may be implemented, for example, via processor 220 executing instructions from memory 230. Additionally or alternatively, some or all of the functional components of call routing system 150 may be hardwired. As shown in FIG. 3, call routing system 150 may include a unified communications interface 310, a routing engine 320, a customer DB interface 330, an ACD metrics cache 340, an ACD interface 350, a rules DB 360, and a work force management module 370.

Unified communications interface 310 may be configured to handle multiple communication methods. For example, unified communications interface 310 may receive a request from IVR system 130 for a call, may identify a type of call associated with the request, and may extract information from the request based on the type of call. As an example, unified communications interface 310 may be configured to handle time division multiplexing (TDM) telephone calls, SIP telephone calls, WebRTC telephone calls, and/or other types of telephone calls. Furthermore, unified communication interface 310 may be configured to handle other types of communication, such as email messages, Short Message Service (SMS) messages, instant messaging messages, and/or other type of communication messages.

Routing engine 320 may receive a request to route a call from unified communication interface 130, along with information associated with the call, may receive customer information associated with a caller from customer DB interface 330, may access ACD metrics from ACD metrics cache 340, may select a rule from rules DB 360, and may select a destination, such as a particular ACD system 160 and/or a particular agent 165, for the call based on the rule and based on the obtained information.

Customer DB interface 330 may communicate with customer DB system 140. For example, customer DB interface 330 may request information relating to a particular customer, associated with a call that is to be routed to a destination, from customer DB 140. ACD metrics cache 340 may store ACD metrics received from ACD systems 160. Exemplary information that may be stored in ACD metrics cache 340 is described below with reference to FIG. 5.

ACD interface 350 may interface with ACD systems 160. As an example, ACD interface 350 may receive real-time ACD metrics data from particular ACD systems 160. For example, ACD interface 350 may receive the real-time ACD metrics data at particular intervals. As another example, ACD interface 350 may forward a call to a selected ACD system 160.

Rules DB 360 may store one or more rules for routing a call to a destination. Exemplary information that may be stored in rules DB 360 is described below with reference to FIG. 4.

Work force management module 370 may provide work flow management information associated with one or more ACD systems 160. Work flow management information may include information relating to the schedule of agents 165. Furthermore, the work flow management information may include information relating to historical call volume data relating to particular types of calls, particular times of day, particular days of week, particular geographic areas, and/or other types of historical call information. The historical call volume data may be used by work force management module 370 to predict future call volume data and may be used to distribute incoming calls to balance call load across multiple ACD systems. For example, routing engine 320 may use the work flow management information together with the ACD metrics information when using a selected rule to route the information. As an example, if ACD metrics information for a particular ACD system 160 indicates that percent occupancy is below a particular threshold in conjunction with historical percent occupancy during a particular time of day, routing engine 320 may average the current percent occupancy with the historical percent occupancy to take into account the fact that the current percent occupancy is unusually low.

Although FIG. 3 shows exemplary functional components of call routing system 150, in other implementations, call routing system 150 may include fewer functional components, different functional components, differently arranged functional components, or additional functional components than depicted in FIG. 3. Additionally or alternatively, one or more functional components of call routing system 150 may perform functions described as being performed by one or more other functional components of call routing system 150.

Figure 4:
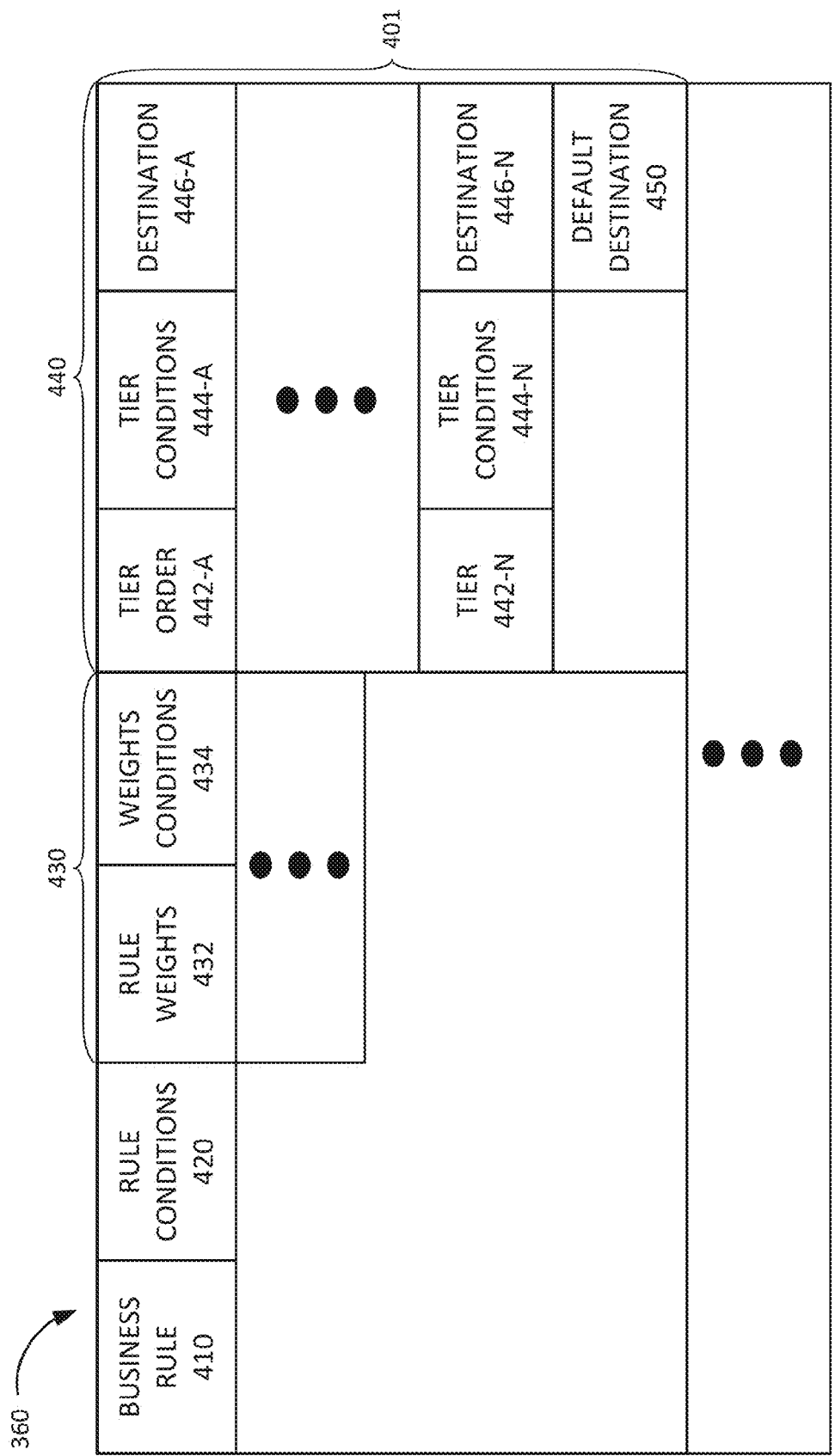
FIG. 4 is a diagram illustrating exemplary information that may be stored in a rules database of the call routing system of FIG. 1.

FIG. 4 is a diagram illustrating exemplary information that may be stored in rules DB 360. As shown in FIG. 4, rules DB 360 may include one or more business rule records 401 (referred to herein collectively as "business rule records 401" and individually as "business rule record 401"). Each business rule record 401 may store information relating to a particular business rule. Business rule record 401 may include a business rule field 410, a rule conditions field 420, one or more rule weights fields 430 (referred to herein as collectively as "rule weights fields 430" and individually as "rule weights field 430"), one or more tier fields 440 (referred to herein collectively as "tier fields 440" and individually as "tier field 440"), and a default destination field 450.

Business rule field 410 may store information identifying the particular business rule associated with business rule record 401. Rule conditions field 420 may store information about the conditions associated with the particular rule. In order for the particular rule to be selected by routing engine 420, the conditions associated with the particular rule may need to be satisfied. As an example, a first rule may be selected during business hours and a second rule may be selected during evening hours. As another example, a first rule may be selected for a first type of call (e.g., a sales call) and a second rule may be selected for a second type of call (e.g., a customer service call). As yet another example, a first rule may be selected for a first geographic area and a second rule may be selected for a second geographic area. As yet another example, a first rule may be selected for a first type of communication method (e.g., a SIP call) and a second rule may be selected for a second type of communication method (e.g., a WebRTC call).

Rule weights field 430 may store a set of weights that may be applied to the conditions of the tiers of the particular rule. Each rule weights field 430 may include a rule weights field 432 and a weights conditions field 434. Rule weights field 432 may store a set of weights that may be applied to the conditions of individual tiers of the rule. Weight conditions field 434 may identify one or more conditions that need to be satisfied in order for the set of weights to be applied to the conditions of the tiers of the rule. For example, a weight of 0 may cause a tier of the rule to be skipped as the weight of 0 may cause the conditions associated with tier to never be satisfied. As an example, a tier with destination ACD system 160 that is operational only during business hours may be skipped for calls placed during evening hours. As another example, a weight may be applied to a tier that includes as a condition an expected wait time. The threshold for the maximum allowable expected wait time may be increased if bandwidth use in network 120 exceeds a particular threshold.

In some implementations, business rule record 401 may further specify one or more alternative sequences for tiers of the business rule along with associated one or more conditions (not shown in FIG. 4). Thus, if the one or more conditions are satisfied, the tiers of the particular rule may be processed in an alternative sequence.

Tier field 440 may store information relating to a particular tier of the particular rule. Thus, tier field 440-A may store information relating to the first tier of the particular rule, tier field 440-B may store information relating to the second tier of the particular rule, and tier field 440-N may store information relating to the last tier of the particular rule. Each tier field 440 may include a tier order field 442, a tier conditions field 444, and a destination field 446.

Tier order field 442 may identify the tier order associated with the particular tier (e.g., first, second, etc.). Tier conditions field 444 may identify on or more conditions associated with the particular tier. Destination field 446 may identify a particular ACD system 160 as a destination associated with the particular tier. Additionally or alternatively, destination field 446 may identify a particular agent 165 as a destination associated with the particular tier. For example, a tier may include one or more conditions that the call satisfy particular criteria, one or more conditions that the customer satisfy particular criteria, one or more conditions that the metrics associated with the destination satisfy particular criteria, etc.

Default destination field 450 may identify a default destination for a call if none of the tiers of the rule are selected based on the conditions associated with the tiers. For example, default destination field 450 may identify a default ACD center 160, an outside call center hired to handle overflow calls, and/or another type of designated default destination.

Although FIG. 4 shows exemplary components of rules DB 360, in other implementations, rules DB 360 may include fewer components, different components, differently arranged components, or additional components than depicted in FIG. 4.

FIG. 5 is a diagram illustrating exemplary information that may be stored in ACD metrics cache 340. As shown in FIG. 5, ACD metric cache 340 may store one or more ACD records 501. Each ACD record 501 may store real-time, or near real-time, data associated with a particular ACD system 160. ACD record 501 may include an ACD field 505, an area of expertise field 510, a number of inbound calls field 515, a number of calls in queue field 520, a number of agents field 525, a percent occupancy field 530, an average handling time field 535, an oldest call waiting time field 540, and a number of agents in queue field 550, a cumulative call count field 555, and a work flow management data field 560.

ACD field 505 may include information identifying a particular ACD system 160 for which the metrics are stored in ACD record 501. Furthermore, ACD field 505 may store information identifying the particular time and date at which the currently stored metrics were received.

Area of expertise field 510 may identify an area of expertise for agents 165 associated with the particular ACD system 160. For example, agents 165 associated with a first ACD system 160 may specialize and/or be trained in handling sales calls, while agents 165 associated with a second ACD system 160 may specialize and/or be trained in handling customer service calls.

Number of inbound calls field 515 may store information about the number of inbound calls being handled by agents 165 associated with the particular ACD system 160. Number of calls in queue field 520 may store information about the number of calls in queue associated with the particular ACD system 160. A call in queue may be on hold while the caller waits to talk to the next available agent 165. Number of agents field 525 may store information about the total number of agents 165 associated with the particular ACD system 160. Furthermore, a particular ACD 160 may include agents with different areas of expertise and the metrics for the number of agents and the number of calls in queue may be provided separately for each particular area of expertise.

Percent occupancy field 530 may store information about the percentage of agents, associated with the particular ACD system 160, that are currently handling calls. For example, if the particular ACD system 160 is associated with 100 agents 165 and 37 agents are talking to callers, the percent occupancy may correspond to 37%. Average handling time field 535 may store information about the average waiting time for a caller routed to the particular ACD system 160. Oldest call waiting time field 540 may store information about the current oldest waiting time for a caller in queue for calls being handled by the particular ACD system 160. Number of agents in queue field 545 may store information about the current number of agents in queue that are waiting to be assigned a call. Cumulative call count field 555 may store information about the cumulative number of calls that have been routed to the particular ACD system 160 during a time period (e.g., during the last 24 hours).

Work flow management data field 560 may store information relating to work flow management data associated with the particular ACD system 160. For example, the work flow management data may include historical metrics associated with the particular ACD system 160, predicted metrics associated with the particular ACD system 260, target metrics associated with the particular ACD system 160, and/or other types of work flow management data.

Although FIG. 5 shows exemplary fields of ACD metrics cache 340, in other implementations, ACD metrics cache 340 may include fewer fields, different fields, differently arranged fields, or additional fields than depicted in FIG. 5.

Figure 6:
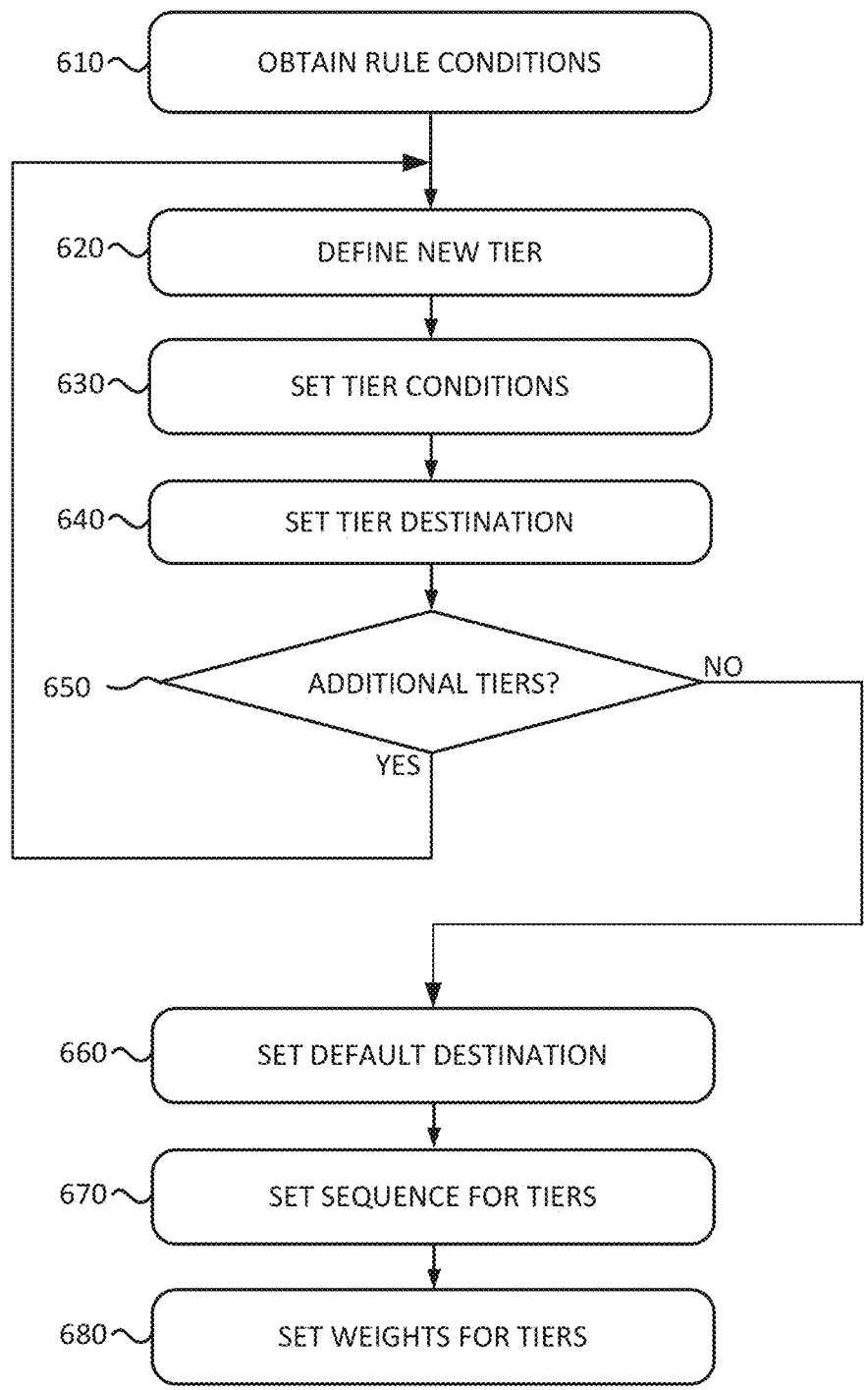
FIG. 6 is a flowchart of a process for generating a business rule according to an implementation described herein.

FIG. 6 is a flowchart of a process for generating a business rule according to an implementation described herein. In one implementation, the process of FIG. 6 may be performed by call routing system 150. In other implementations, some or all of the process of FIG. 6 may be performed by another device or a group of devices separate from and/or including call routing system 150.

The process of FIG. 6 may include obtaining rule conditions (block 610). For example, call routing system 150 may generate a new business rule record 401 and may obtain one or more conditions that may be used to select the new rule, such as temporal conditions (e.g., a particular time of day, a particular day of the week, etc.), a particular location (e.g., a particular city, a particular routing device, etc.), classification conditions (e.g., a particular reason for the call, a particular type of customer, etc.), and/or other types of conditions.

A new tier may be defined (block 620), tier conditions may be set (block 630), and a tier destination may be set (block 640). For example, the administrator may define a new tier, may define a destination for the tier, and may define one or more conditions that need to be satisfied in order for a call to be routed to the destination associated with the tier. For example, the one or more conditions may specify one or more conditions associated with a call, one or more conditions associated with a customer, one or more conditions associated with metrics for the specified destination, and/or other types of conditions.

A determination may be made as to whether additional tiers are to be included in the rule (block 650). For example, call routing system 150 may prompt an administrator as to whether additional tier should be added to the rule. If it is determined that additional tiers are to be included (e.g., based on the administrator input) (block 650—YES), processing may return to block 620 to set a new tier. If it is determined that no additional tier are to be included (block 650—NO), processing may continue to set a default destination (block 660). For example, a destination designated for overflow calls, which cannot be handled by any of ACD centers 160, may be specified for the rule.

A sequence for the tiers may be set (block 670). The tiers may be ordered in the sequence in which they were entered. Alternatively, the tiers may be re-ordered into a particular order. Furthermore, in some implementation, one or more alternative sequences for the tiers may be defined and conditions may be specified for using each of the alternative sequences.

Weights for the tiers may be set (block 680). For example, call routing system 150 may generate a set of weights that may be applied to conditions of the tiers of the rule under particular conditions. A default condition may be that no weights are applied unless a particular condition is satisfied. For example, particular ACD systems 160 may not be configured to handle WebRTC agents 165. Thus, if a WebRTC call is to be routed for caller 110, tiers whose destination corresponds to one of the particular ACD systems 160 that are not configured to handle WebRTC calls may be assigned a weight that causes the destinations of the tiers not to be selected.

Figure 7:
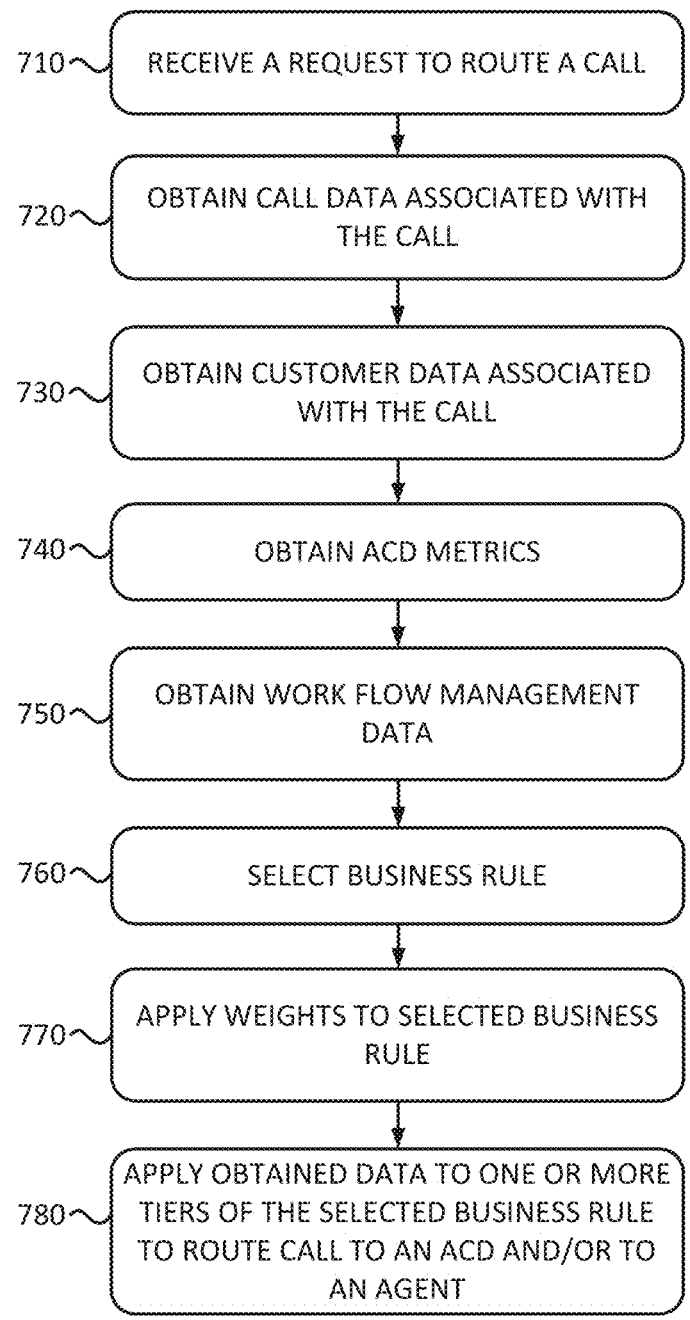
FIG. 7 is a flowchart for processing a call according to an implementation described herein.

FIG. 7 is a flowchart for processing a call according to an implementation described herein. In one implementation, the process of FIG. 7 may be performed by call routing system 150. In other implementations, some or all of the process of FIG. 7 may be performed by another device or a group of devices separate from and/or including call routing system 150.

The process of FIG. 7 may include receiving a request to route a call (block 710). For example, IVR system 130 may receive a call from caller 110 and may obtain information associated with the call based on information received from caller 110 and/or based on information provided by the caller in response to prompts generated by IVR system 130. IVR system 130 may then send a request to call routing system 150 to select a destination ACD system 160 for the call.

Call data, associated with the call, may be obtained (block 720). For example, unified communications interface 310 may extract the call data from the received request and/or may send a request to IVR system 130 to obtain particular types of data. Other types of data, such as time of day data, may be determined without having to obtain the data from IVR system 130. Call data, associated with the call, that may be obtained may include a time of day for the call, a day of the week for the call, network data associated with the call (e.g., a particular network device and/or network link associated with the call; current network conditions, such as available bandwidth; packet loss rate; etc.), a communication method associated with the call (e.g., TDM call, SIP call, WebRTC call, etc.), a reason for the call, statistics associated with the call (e.g., total elapsed duration for the call, total time the caller has been on hold, the number of transfers that the caller has been through, etc.), and/or other types of call data that may be obtained by IVR system 130 and/or determined by call routing system 150.

Customer data, associated with the call, may be obtained (block 730). For example, unified communications interface 310 may obtain information identifying a customer, associated with the call, from IVR system 130. For example, IVR system 130 may prompt the caller to enter a name, an account number, a phone number, and/or other type of identifying information. In some implementations, the customer may be identified based on an identifier associated with and obtained from caller 110, such as a telephone number (e.g., a Mobile Directory Number MDN), a SIP Uniform Resource Identifier (URI), etc.) and/or a device identifier (e.g., an International Mobile Equipment Identifier (IMEI), an Integrated Circuit Card Identifier (ICCI), an Internet Protocol (IP) address, a Media Access Control (MAC) address, etc.). Customer DB interface 330 may use the obtained customer identification information to obtain customer information from customer DB system 140. For example, customer DB interface 330 may obtain the customer's name, the customer's location and/or address, the customer's contact information (e.g., phone number, address, email address, etc.), the customer's account number, the customer's account type and/or subscription type, the customer's order history, the customer's billing history, and/or other types of customer information. Moreover, the customer information may include an indication flagging the customer for a particular action, such as billing review, a sales promotion, etc.

ACD metrics may be obtained (block 740). For example, ACD interface 350 may continue to receive real-time, or near real-time, metrics data from ACD systems 160 and may store the received metrics data in ACD metrics cache 340. Routing engine 320 may access ACD metrics cache 340 to determine metrics associated with a particular ACD system 160, such as the metrics described above with reference to FIG. 5.

Work flow management data may be obtained (block 750). For example, work force management module 370 may obtain work flow management data associated with one or more ACD systems 160, such as historical metrics data, expected metrics data, target metrics data, and/or other types of work flow management data.

A business rule may be selected (block 760). For example, routing engine 320 may access rules DB 360 and may select a particular rule based on the obtained information associated with the call and/or the obtained information associated with the customer, and/or based on the obtained metrics and/or obtained work flow management data, by accessing rule conditions fields 420 of rule records 401 stored in rules DB 360.

Weights may be applied to the selected business rule (block 770). For example, routing engine 320 may determine whether weights conditions for any weights fields 430 in the selected rule are satisfied based on the obtained information. If a particular set of conditions is satisfied, routing engine 320 may select the corresponding set of weights and may apply the set of weights to the conditions of the tiers of the selected rule.

The obtained data may be applied to one or more tiers of the selected business rule to route the call to an ACD and/or to an agent (block 780). For example, routing engine 320 may use the selected rule and the obtained information to process the tiers of the rule in sequence to select a destination for the call. Processing of the tiers of the rule is described below with reference to FIG. 8.

Figure 8:
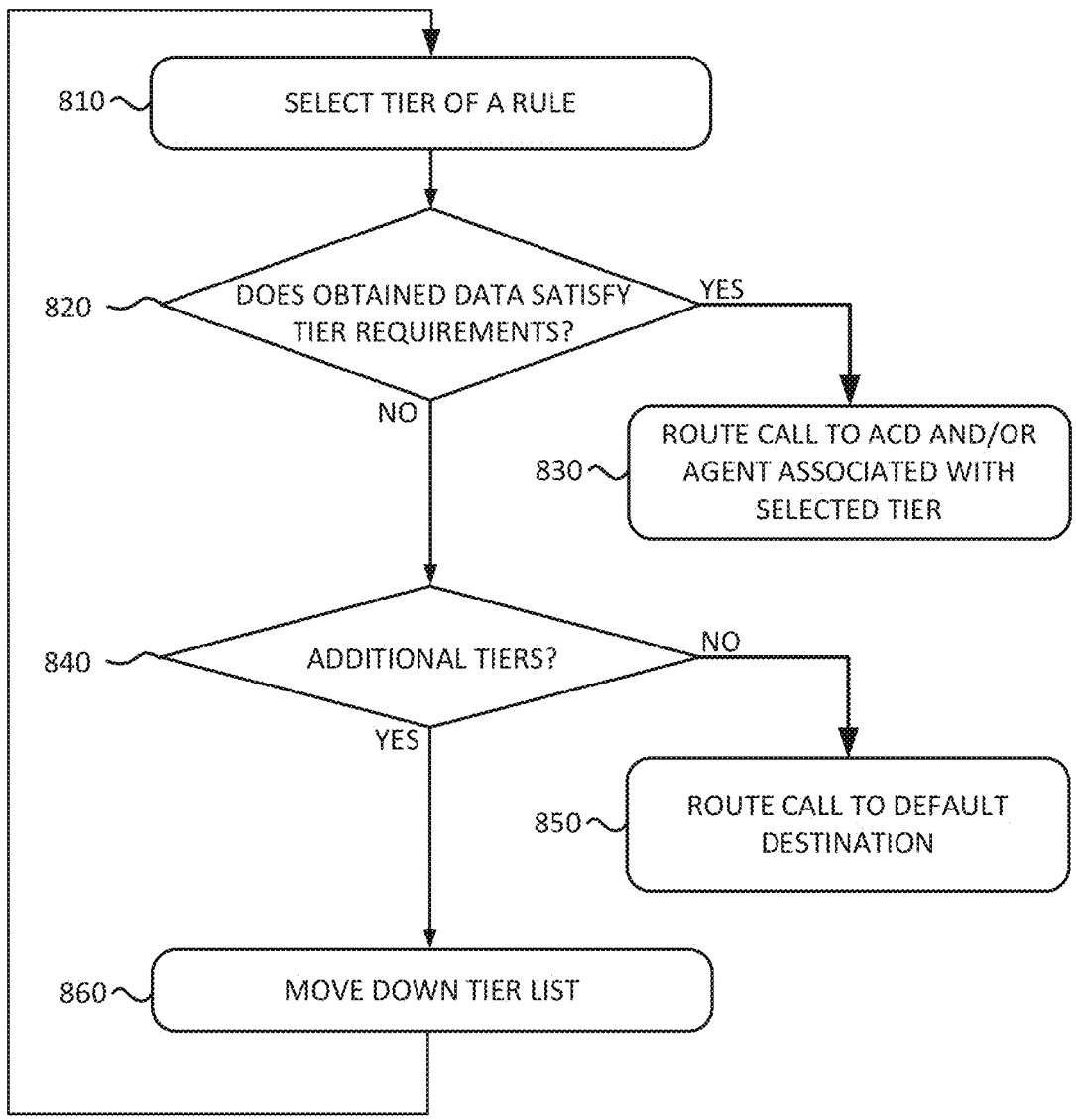
FIG. 8 is a flowchart for processing a business rule according to an implementation described herein.

FIG. 8 is a flowchart of processing a business rule according to an implementation described herein. In one implementation, the process of FIG. 8 may be performed by call routing system 150. In other implementations, some or all of the process of FIG. 8 may be performed by another device or a group of devices separate from call routing system 150 and/or including call routing system 150.

The process of FIG. 8 may include selecting a tier of a rule (block 810) and a determination may be made as to whether the obtained data satisfies the tier requirements (block 820). For example, rules engine 320 may start by selecting the first tier in the selected rule and determining whether the conditions specified in tier conditions field 444 of the tier match the obtained information associated with the call, the obtained information associated with the customer, the obtained ACD metrics, and/or the obtained work flow management data.

If it is determined that the obtained data satisfies the tier requirements (block 820—YES), the call may be routed to the ACD and/or agent associated with the selected tier (block 830). For example, rules engine 320 may retrieve information identifying a particular ACD system 160 from destination field 446 (e.g., a telephone number, an IP address, a SIP URI, a WebRTC URI, etc.) of the selected tier and may instruct IVR system 130 to forward the call to the identified ACD system 160.

If it is determined that the obtained data does not satisfy the tier requirements (block 820—NO), a determination may be made as to whether additional tiers exist in the rule (block 840). For example, routing engine 320 may determine whether additional tier field 440 exist in the selected rule record 401. If it is determined that no additional rules exist (block 840—NO), the call may be routed to a default destination (block 850). For example, rules engine 320 may retrieve information identifying a default destination from default destination field 450 (e.g., a telephone number, an IP address, a SIP URI, a WebRTC URI, etc.) of the selected tier and may instruct IVR system 130 to forward the call to the identified default destination. If it is determined that additional rules do exist (block 840—YES), the process may move down the tier list (block 860) and return to block 810 to select the next tier of the rule.

While the processes of FIGS. 6-8 are described above with respect to routing calls, in other implementations, the processes of FIGS. 6-8 may be applied to other forms of communication. For example, one or more rules may be generated for routing an instant messaging (IM) conversation to a particular distribution center and/or to a particular agent 165. When an instant messaging message is received via network 120, the IM message may be routed to call routing system 150 and information associated with IM message may be obtained. If a customer associated with the IM message is identified, customer DB interface 330 may obtain information relating to the customer from customer DB system 140. Furthermore, metrics relating to IM distribution centers, and/or relating to particular agents 165, may be collected by ACD interface 350 and work flow management module 370 may provide work flow management data to routing engine 320. Routing engine 320 may select a particular rule from rules DB 360 for routing the IM message and may forward the IM message to a particular IM distribution center and/or a particular agent 165 based on the tiers of the selected rule.

Figure 9:
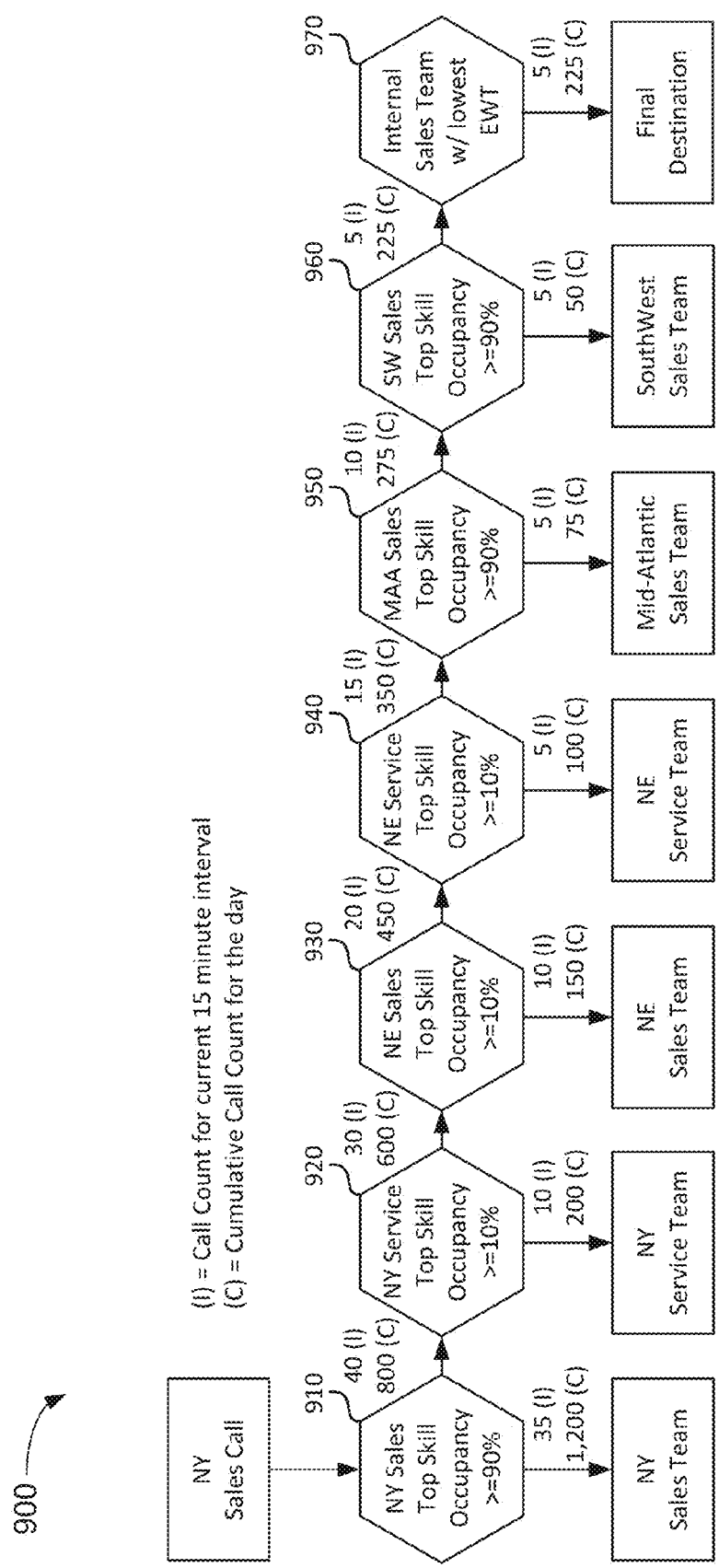
FIG. 9 is a first exemplary call flow according to an implementation described herein.

FIG. 9 is a first exemplary call flow 900 according to an implementation described herein. As shown in the example of FIG. 9, a request to route a sales call from a caller located in New York (NY) may be received by call routing system 150 and a rule may be selected based on the location. Thus, a rule may be selected that first checks whether destinations in NY are available. A first tier 910 may check whether a NY sales team has a percent occupancy less than 90%. If the percent occupancy is less than 90%, the NY sales call may be routed to an ACD system 160 associated with the NY sales team.

Assuming the NY sales team has a percent occupancy over 90%, routing engine 320 may move to tier 920. Tier 920 may check whether the next most suitable team for the call, a NY service team, has a percent occupancy of less than 10%. If the percent occupancy is less than 10%, the NY sales call may be routed to an ACD system 160 associated with the NY service team. Assuming the NY service team has a percent occupancy above 10%, routing engine 320 may move to tier 930. Tier 930 may check whether the next most suitable team for the call, a Northeast (NE) sales team, has a percent occupancy of less than 10%. If the percent occupancy is less than 10%, the NY sales call may be routed to an ACD system 160 associated with the NE sales team. Assuming the NE sales team has a percent occupancy above 10%, routing engine may move to tier 940.

Tier 940 may check whether the next most suitable team for the call, an NE service team, has a percent occupancy of less than 10%. If the percent occupancy is less than 10%, the NY sales call may be routed to an ACD system 160 associated with the NE service team. Assuming the NE service team has a percent occupancy above 10%, routing engine 320 may move to tier 950. Tier 950 may check whether the next most suitable team for the call, a Mid-Atlantic (MAA) sales team, has a percent occupancy of less than 90%. If the percent occupancy is less than 90%, the NY sales call may be routed to an ACD system 160 associated with the MAA sales team. Assuming the MAA sales team has a percent occupancy above 90%, routing engine may move to tier 960.

Tier 960 may check whether the next most suitable team for the call, a Southwest (SW) sales team, has a percent occupancy of less than 90%. If the percent occupancy is less than 90%, the NY sales call may be routed to an ACD system 160 associated with the SW sales team. Assuming the SW sales team has a percent occupancy above 90%, routing engine 320 may determine that tier 960 corresponds to the last tier and may route the call to the default destination 970. Default destination 970 may specify that the call should be routed to an Internet sales team with the lowest estimated wait time. Thus, routing engine 320 may access ACD metrics cache 340 and may select an ACD system 160, associated with an Internet sales team, that is associated with the lowest estimated wait time based on information stored in expected wait time fields 540 of AC records 501.

Figure 10:
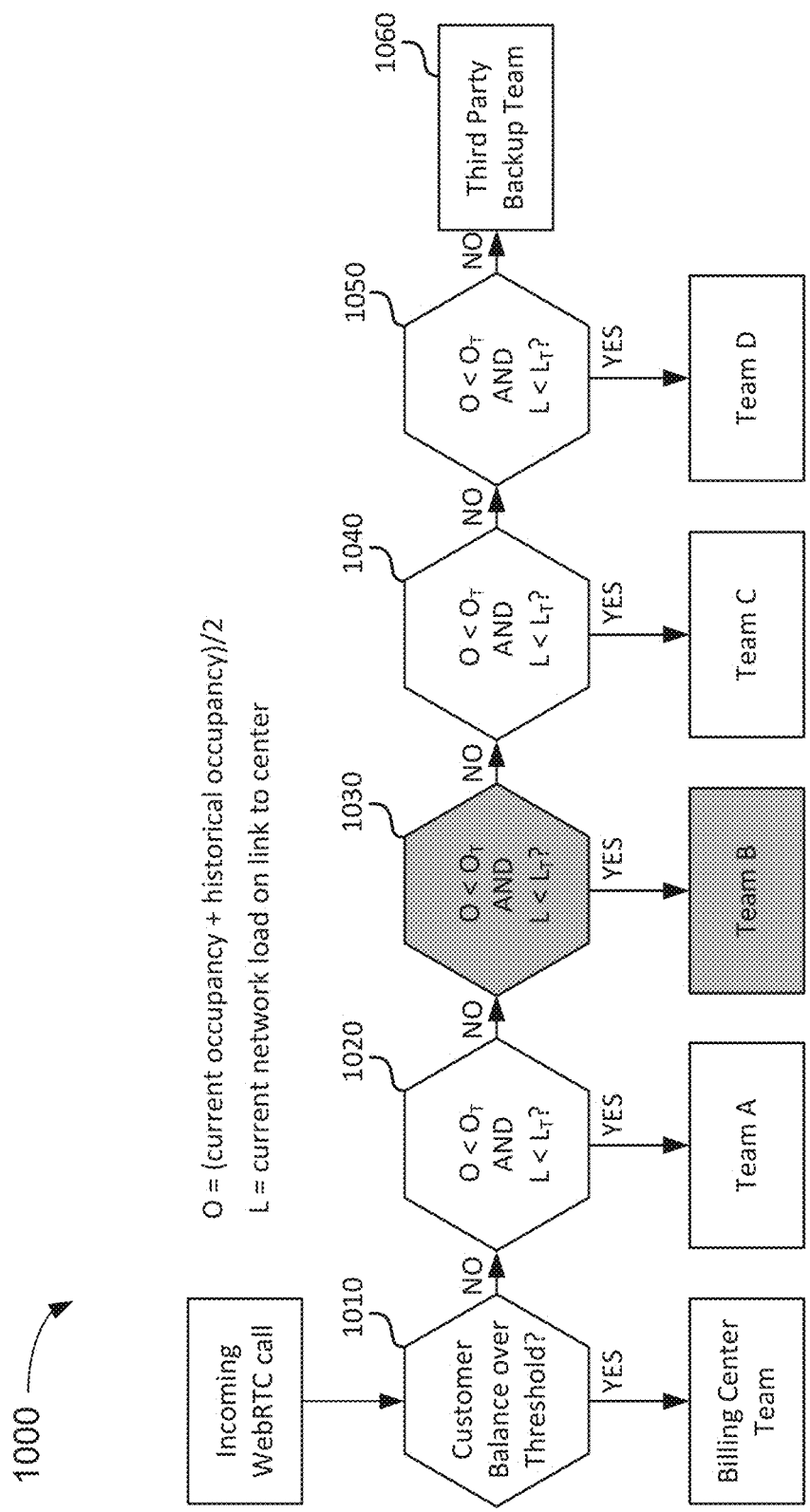
FIG. 10 is a second exemplary call flow according to an implementation described herein.

FIG. 10 is a second exemplary call flow 1000 according to an implementation described herein. As shown in the example of FIG. 10, call routing system 150 may receive a request to route an incoming WebRTC call and a rule for routing WebRTC calls may be selected. The selected rule may include 5 tiers: tier 1010, tier 1020, tier 1030, tier 1040, and tier 1050. Call routing system 150 may request customer information, associated with the WebRTC call, from customer DB system 140. Customer DB system 140 may provide the requested customer information, which may include a balance associated with the customer.

Furthermore, call routing system 150 may determine that the selected rule for routing WebRTC calls includes a set of weights that are to be applied to the rule during evening hours. For example, assume that team B only has agents that are active during business hours. Therefore, a call received during the evening hours may trigger the set of weights to be applied that skips tier 1030, because tier 1030 is associated with team B as the destination.

Moreover, the selected WebRTC rule may include a sequence order for tiers 1020, 1030, 1040, and 1050 that is based on the distance, measured in the number of network hops, from the caller. Thus, assuming team A is associated with a particular ACD system 160 that is the closest to the caller, in terms of network hops, followed by team B, then team C, and finally team D, tiers 1020, 1030, 1040, and 1050 may be ordered based on this sequence.

Routing engine 320 may process tier 1010 first. Tier 1010 may check whether the customer's balance is over a balance threshold. If the customer's balance is over the balance threshold, the call may be routed to a particular ACD system 160 associated with a billing center team. If the customer's balance is not over the balance threshold, routing engine 320 may proceed to tier 1020. Tier 1020 may check whether metrics associated with team A match the criteria specified in the conditions of the tier. A first condition may require that an average of the current occupancy of team A and a historical occupancy during the current time of day are less than an occupancy threshold. A second condition may require that the network load on a link to the ACD center 160 associated with team A is less than a load threshold. If the conditions are satisfied, the call may be routed to the ACD center 160 associated with team A. If the conditions are not satisfied, routing engine 320 may proceed to tier 1030.

Tier 1030 may be skipped because of the weights that have been applied to the rule (e.g., a weight of 0 may be applied to tier 1030 during evening hours), as shown in FIG. 10 by tier 1030 being shaded out. Routing engine 320 may proceed to tier 1040. Tier 1040 may check the same conditions for team C as were checked for team A in tier 1020. Thus, a first condition may require that an average of the current occupancy of team C and a historical occupancy during the current time of day are less than an occupancy threshold. A second condition may require that the network load on a link to the ACD center 160 associated with team C is less than a load threshold. If the conditions are satisfied, the call may be routed to the ACD center 160 associated with team C. If the conditions are not satisfied, routing engine 320 may proceed to tier 1050.

Tier 1050 may check the same conditions for team D as were checked for team A in tier 1020. Thus, a first condition may require that an average of the current occupancy of team D and a historical occupancy during the current time of day are less than an occupancy threshold. A second condition may require that the network load on a link to the ACD center 160 associated with team D is less than a load threshold. If the conditions are satisfied, the call may be routed to the ACD center 160 associated with team D. If the conditions are not satisfied, routing engine 320 may proceed to the default destination 1060. Default destination 1060 may route the call to an ACD system 160 associated with a third party backup team.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 6-8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
   receiving, by the computer device, a request to route a call;
   obtaining, by the computer device, information associated with the call;
   obtaining, by the computer device, one or more metrics associated with a plurality of automatic call distribution centers;
   selecting, by the computer device, a rule to route the call based on the information associated with the call, wherein the rule includes a plurality of tiers, and wherein a particular one of the plurality of tiers includes:
      an order of the particular tier in a sequence of the plurality of tiers,
      one or more conditions associated with the particular tier, and
      a destination associated with the particular tier, wherein the one or more conditions specify requirements for the one or more metrics associated with an automatic call distribution center corresponding to the destination associated with the particular tier; and
   selecting, by the computer device, a particular destination for the call based on the selected rule, based on the obtained information associated with the call, and based on the obtained one or more metrics.

2. The method of claim 1, wherein selecting the destination for the call includes:
   selecting the particular tier;
   determining whether the obtained information associated with the call and the obtained one or more metrics satisfy the one or more conditions associated with the particular tier;
   routing the call to the destination associated with the particular tier, in response to determining that the obtained information associated with the call and the obtained one or more metrics satisfy the one or more conditions associated with the particular tier; and
   selecting a next tier from the plurality of tiers based on the sequence of the plurality of tiers, in response to determining that the obtained information associated with the call and the obtained one or more metrics do not satisfy the one or more conditions associated with the particular tier.

3. The method of claim 1, further comprising:
   selecting a set of weights based on the information associated with the call; and
   applying the selected set of weights to the one or more conditions associated with the particular tier.

4. The method of claim 1, wherein obtaining the one or more metrics, associated with the plurality of automatic call distribution centers, includes:
   obtaining the one or more metrics in real-time.

5. The method of claim 1, wherein the one or more metrics, associated with the plurality of automatic call distribution centers, include:
   a number of inbound calls associated with a particular automatic call distribution center;
   a number of calls in queue associated with the particular automatic call distribution center;
   a number of agents associated with the particular automatic call distribution center;
   a percent occupancy associated with the particular automatic call distribution center;
   an average handling time associated with the particular automatic call distribution center;
   an expected wait time associated with the particular automatic call distribution center;
   an oldest call wait time associated with the particular automatic call distribution center;
   a number of agents in queue associated with the particular automatic call distribution center; or
   a cumulative call count associated with the particular automatic call distribution center.

6. The method of claim 1, wherein the information associated with the call includes:
   a reason for the call provided by a caller;
   one or more statistics associated with the call;
   information relating to the caller; or
   time information associated with the call.

7. The method of claim 6, wherein the information relating to the caller includes:
   information identifying an account associated with the caller;
   information identifying a customer account type associated with the caller; or
   information flagging the caller for a particular action.

8. The method of claim 1, further comprising:
   obtaining work flow management data associated with one or more automatic call distribution centers; and
   wherein selecting the destination for the call is further based on the obtained work flow management data.

9. A computer device comprising:
   a memory to store instructions; and
   a processor configured to execute the stored instructions to:
      receive a request to route a call from an interactive voice response system;
      obtain information associated with the call;
      obtain one or more metrics associated with one or more automatic call distribution centers;
      select a rule to route the call based on the information associated with the call, wherein the rule includes a plurality of tiers, and wherein a particular one of the plurality of tiers includes:
         an order of the particular tier in a sequence of the plurality of tiers,
         one or more conditions associated with the particular tier, and
         a destination associated with the particular tier, wherein the one or more conditions specify requirements for the one or more metrics associated with an automatic call distribution center corresponding to the destination associated with the particular tier; and
      select a particular automatic call distribution center for the call based on the selected rule, based on the obtained information associated with the call, and based on the obtained one or more metrics.

10. The computer device of claim 9, wherein, when the processor selects the destination for the call, the processor is further configured to:
   select the particular tier;
   determine whether the obtained information associated with the call and the obtained one or more metrics satisfy the one or more conditions associated with the particular tier;
   route the call to the destination associated with the particular tier, in response to determining that the obtained information associated with the call and the obtained one or more metrics satisfy the one or more conditions associated with the particular tier; and select a next tier from the plurality of tiers based on the sequence of the plurality of tiers, in response to determining that the obtained information associated with the call and the obtained one or more metrics do not satisfy the one or more conditions associated with the particular tier.

11. The computer device of claim 9, wherein the one or more metrics, associated with one or more automatic call distribution centers, include:
   a number of inbound calls associated with the particular automatic call distribution center;
   a number of calls in queue associated with the particular automatic call distribution center;
   a number of agents associated with the particular automatic call distribution center;
   a percent occupancy associated with the particular automatic call distribution center;
   an average handling time associated with the particular automatic call distribution center;
   an expected wait time associated with the particular automatic call distribution center;
   an oldest call wait time associated with the particular automatic call distribution center;
   a number of agents in queue associated with the particular automatic call distribution center; or
   a cumulative call count associated with the particular automatic call distribution center.

12. The computer device of claim 9, wherein the information associated with the call includes:
   a reason for the call provided by a caller;
   one or more metrics associated with the call;
   information relating to the caller; or
   temporal information associated with the call.

13. The computer device of claim 12, wherein the information relating to the caller includes:
   information identifying an account associated with the caller;
   information identifying a customer type associated with the caller; or
   information flagging the caller for a particular action.

14. The computer device of claim 9, wherein the processor is further configured to:
   obtain work flow management data associated with the one or more automatic call distribution centers; and
   wherein the logic is further configured to select the particular automatic call distribution center for the call based on the obtained work flow management data.

15. A non-transitory computer-readable medium storing instructions executable by one or more processors, the non-transitory computer-readable medium comprising one or more instructions to:
   receive a request to route a communication session;
   obtain information associated with the communication session;
   obtain one or more metrics associated with one or more agent centers;
   select a rule to route the communication session, wherein the rule includes a plurality of tiers, and wherein a particular one of the plurality of tiers includes:
      an order of the particular tier in a sequence of the plurality of tiers,
      one or more conditions associated with the particular tier, and
      a destination associated with the particular tier, wherein the one or more conditions specify requirements for the one or more metrics associated with an agent center corresponding to the destination associated with the particular tier; and
   select a particular agent center from the one or more agent centers based on the selected rule, based on the obtained information associated with the communication session, and based on the obtained one or more metrics.

16. The non-transitory computer-readable medium of claim 15, wherein the communication session includes:
   a time division multiplexing telephone call session;
   a Session Initiation Protocol session;
   a Web Real-Time Communication session;
   an email message;
   an instant messaging session; or
   a Short Message Service message.

17. The non-transitory computer-readable medium of claim 15, wherein the one or more instructions to select the particular agent center include one or more instructions to:
   select the particular tier;
   determine whether the obtained information associated with the communication session and the obtained one or more metrics satisfy the one or more conditions associated with the particular tier;
   route the communication session to the destination associated with the particular tier, in response to determining that the obtained information associated with the communication session and the obtained one or more metrics satisfy the one or more conditions associated with the particular tier; and
   select a next tier from the plurality of tiers based on the sequence of the plurality of tiers, in response to determining that the obtained information associated with the communication session and the obtained one or more metrics do not satisfy the one or more conditions associated with the particular tier.

18. The non-transitory computer-readable medium of claim 15, wherein the one or more metrics, associated with the one or more agent centers, include:
   a number of inbound calls associated with a particular agent center;
   a number of calls in queue associated with the particular agent center;
   a number of agents associated with the particular agent center;
   a percent occupancy associated with the particular agent center;
   an average handling time associated with the particular agent center;
   an expected wait time associated with the particular agent center;
   an oldest call wait time associated with the particular agent center;
   a number of agents in queue associated with the particular agent center; or
   a cumulative call count associated with the particular agent center.

19. The non-transitory computer-readable medium of claim 15, wherein the information associated with the communication session includes:
   a reason for the communication session provided by a caller;
   one or more statistics associated with the communication session;
   information relating to the caller; or
   time information associated with the communication session.

20. The non-transitory computer-readable medium of claim 19, wherein the information relating to the caller includes:
   information identifying an account associated with the caller;
   information identifying a customer account type associated with the caller; or
   information flagging the caller for a particular action.

\* \* \* \* \*